United States Patent [19]
Gonthier et al.

[11] Patent Number: 5,395,574
[45] Date of Patent: Mar. 7, 1995

[54] METHOD FOR THE PRODUCTION OF A COMPOSITE PRODUCT BY MOULDING

[75] Inventors: Michel Gonthier, Jacob Bellecombette; Anne Avena, Seynod; Jean-Marc Bain, Barberaz, all of France

[73] Assignee: Vetrotex France, Chambery, France

[21] Appl. No.: 10,937

[22] Filed: Jan. 29, 1993

[30] Foreign Application Priority Data

Jan. 30, 1992 [FR] France ............................ 92 00996

[51] Int. Cl.$^6$ ............................................. B29C 67/14
[52] U.S. Cl. ................................... 264/135; 264/137; 264/143; 264/319; 264/328.2; 264/DIG. 53; 65/450; 65/451
[58] Field of Search ............... 264/134, 135, 136, 137, 264/145, 299, 328.2, 143, DIG. 53, 319, 328.17; 65/3.41, 3.43

[56] References Cited

U.S. PATENT DOCUMENTS

| | | | |
|---|---|---|---|
| 3,823,219 | 7/1974 | Ward, Jr. et al. | 264/DIG. 53 |
| 4,382,991 | 5/1983 | Pollman | 65/3.43 |
| 4,488,686 | 12/1984 | Reese | 242/186 |
| 4,536,446 | 8/1985 | Hsu et al. | 65/3.44 |
| 4,615,946 | 10/1986 | Temple | 65/3.43 |
| 4,637,956 | 1/1987 | Das et al. | 65/3.41 |
| 4,806,298 | 2/1989 | Wilkinson et al. | 264/143 |
| 4,990,549 | 2/1991 | Delvin et al. | 523/209 |
| 5,242,958 | 9/1993 | Klett | 428/378 |

FOREIGN PATENT DOCUMENTS

| | | | |
|---|---|---|---|
| 0162421 | 5/1985 | European Pat. Off. | |
| 3-246011 | 11/1991 | Japan | 264/143 |

Primary Examiner—Jay H. Woo
Assistant Examiner—Robert B. Davis
Attorney, Agent, or Firm—Pennie & Edmonds

[57] ABSTRACT

A method of moulding, notably injection or compression moulding, of a composite product from an impregnation paste based upon thermosetting resin or resins and a reinforcement of glass threads, by supplying the moulds with an impregnation paste and reinforcement in the form of coated chopped direct rovings incorporated into the paste, the coating material of which includes an adhesive agent based upon polyurethane or polyurethanes.

15 Claims, No Drawings

METHOD FOR THE PRODUCTION OF A COMPOSITE PRODUCT BY MOULDING

FIELD OF THE INVENTION

This invention concerns moulding methods for composite products comprising, essentially, on the one hand thermosetting resins and on the other hand reinforcing threads, notably of glass.

BACKGROUND OF THE INVENTION

The techniques of moulding that are standard for reinforced thermosetting resins consist of subjecting the resin associated in a pasty form with the reinforcement to the conjugate action of pressure and heat inside a mould. In the mould, cross-linking is thus caused to take place. This hardens the resin and gives to it the shape of the mould in a definitive manner.

It then remains to eject the composite piece thus formed from the mould. A distinction can be drawn between various types of technique, linked notably to the feed device for the mould and to the functioning thereof.

In the case of compression moulding, the feed system is of the piston type and the mould is constituted of two half-moulds. One half fits by a vertical translatory motion into the other, in which the resin and the reinforcement are present.

In the case of injection moulding, moulding devices are used based upon the same principle as those used for the moulding of thermoplastics, but adapted to thermosetting materials. The resin, associated with the reinforcement, is introduced into a cylinder provided with an Archimedean screw. The material is subsequently injected in defined proportions into the mould, which then opens out into two parts for the moulding to be ejected.

In each of these techniques, the efforts of the industry are directed towards reducing the cycle time for the moulding, which now is of the order of one minute, from the introduction into the feed system for the mould to the ejection of the final composite. But efforts are also being applied to the optimization of the steps for the production and processing of the starting constituents, Which precede the moulding proper, notably of the step known as the mixing step. This step consists of incorporating the reinforcement into the resin. The aim is to achieve this without the quality of the composite being adversely affected thereby.

This composite must, in effect, combine mechanical and aesthetic properties in a perfectly reproducible manner. It is the function the glass thread reinforcement to give mechanical properties to the composite material, and notably its mechanical characteristics in bending and/or when subjected to shock or impact.

Furthermore, the external appearance of the component must avoid defects such as problems of planeity, flash, visible fibres, or dimensional problems. These problems can result, for instance, from incomplete filling of the mould in the case of injection moulding, or from a too pronounced "shrinkage" phenomenon.

All these requirements mean, notably, that efforts are made to achieve an optimum distribution between reinforcement and resin.

In known manner, any moulding operation is preceded by the preparation of that which hereinafter will be termed impregnation paste, that is to say the mixture of the thermosetting resins, such as an unsaturated polyesters, with the usual additives, such as for example fillers, a catalyst, a stabilizer, and a demoulding agent.

On the other hand, the thread reinforcement is obtained by chopping one or more basic threads, each composed of a large number of continuous filaments. These filaments are obtained by mechanical drawing of the molten glass flowing from a plurality of orifices disposed on the bottom of a bushing, generally heated by Joule effect. These filaments are coated, and assembled without twisting into at least one thread before being wound into the form of a coil on a mandrel.

A collection of threads may be produced by simultaneously unreeling several coils, then assembling them together in parallel and winding them onto a mandrel to form a stand. This strand is then termed "assembled roving", the strand subsequently being chopped into pieces of varying length.

It then remains to incorporate, into the impregnation paste previously defined, the reinforcement in the form of these pieces of assembled roving, in order to manufacture what is known as "prepreg". This operation takes place in a mixer, in a manner known to the person skilled in the art, either by a humid process or by a dry process. Afterwards, this prepreg is allowed to "ripen" for a given period of time before it can be used for supplying the moulds.

In this way composite products are obtained, the quality of which may be judged satisfactory overall. So many parameters are involved that the specialist can optimize the mechanical and/or aesthetic characteristics that are more particularly desired.

However, it still remains that the production phase for these assembled roving strands can be broken down into several steps, of a discontinuous nature, and requires operations such as the unwinding-rewinding step, operations which require both time and space. It is thus necessary to provide for storage room, and for sufficient equipment for carrying out the winding.

In fact, by choosing the reinforcement in the form of assembled roving, the person skilled in the art had arrived at a kind of compromise, since the reinforcement had to comply with fundamentally contradictory criteria.

First of all, since the reinforcement was incorporated into the impregnation paste in the form of short lengths, the make-up of the roving strand must be such that, when it is cut, the appearance of isolated filaments which become electrostatically charged and foul the cutting apparatus shall be as small as possible. The assembled roving strands, by reason of the fact that they are made of threads possessing their own cohesion and of small size considered one by one, satisfy this criterion well.

Subsequently, chopped strands obtained are mixed with the impregnation paste and, during this step, the reinforcement should disperse in optimum manner. Here again, the assembled roving eminently satisfies this requirement. In fact, the threads have no cohesion whatever among themselves within the strand and they separate at the end of the chopping operation. This first division prepares and promotes the later dispersion of the reinforcement within the body of the resin in the form of filaments. This shows how much the presentation of the reinforcement in the strand and the coating substance used play a major part in reconciling contradictory requirements. Since the assembled roving best complies with these requirements, the person skilled in the art, in spite of the disadvantages which this product possesses in other respects, has concentrated on improving the coating of the threads of which it is made.

SUMMARY OF THE INVENTION

The invention now has as its objective to propose a method of obtaining composite products by moulding from reinforced thermosetting resins, the carrying out of which shall be more rapid and/or simpler, without thereby altering, or perhaps even by improving, the quality of the composite products.

The invention is a method of moulding, notably by compression or injection, of a composite product starting from an impregnation paste based upon thermosetting resin or resins and a reinforcement of glass threads, consisting of supplying the moulds with a pre-impregnated material incorporating the reinforcement in the form of a chopped direct roving, the coating of which comprises an adhesive agent based upon a polyurethane or polyurethanes.

This direct roving is not constituted like the assembled roving, which is in the form of a strand produced by combining together several threads, each thread being made up by the association of filaments mechanically drawn from the bushing. On the contrary, the direct roving is made from a strand of equivalent size to that of an assembled roving, but produced directly beneath the bushing from a large number of filaments before being wound onto a mandrel.

By using the direct roving as reinforcement for thermosetting resins, whereas until now it has been used essentially in the context of processes by winding to make pipes, notably, all the intermediate steps required by the assembled roving are eliminated, that is to say the formation of "cakes" of thread beneath the bushing which then need to be flaked out and rewound into strands. As a consequence, at an industrial level a saving is obtained in time, in manual labor, in equipment, in storage area and therefore in cost, which is very notable.

However, this replacement of one type of reinforcement by another is very far from being obvious, in that the cohesion forces of the assembled roving strands are certainly very different from those of the direct roving strands. This is why the choice of the coating for the direct roving according to this invention, based upon polyurethane, has proved to be of primary importance for this reinforcement not to affect the entire process of production of the desired composite products.

To replace assembled rovings by direct rovings was to presage, for the specialist in the art, many problems. Thus, during chopping direct roving strands, since they are not made up of "sub-units" of threads, did not have a predictable behavior, and everything led one to believe that the strands, in the form of a ribbon, would be much more difficult to chop because they were more highly compacted, with the consequent risk that they might open out under the cutting tool in an uncontrolled manner, leading to agglomerating and clogging.

In addition, during mixing again, the specialist might justifiably fear that the chopped strands of direct roving might disperse in the impregnation paste in a heterogeneous manner, notably by opening out into agglomerates of filaments of different sizes, which would lead to less satisfactory mechanical behavior of the composite products and even to mixing steps which would be much longer or consume more energy, thus leading to a risk of deterioration of the strands.

But nevertheless, in a particularly unexpected way, the use of a direct roving in combination with a specific coating substance, the adhesive agent of which is of the polyurethane or polyurethanes, possibly associated with one or more epoxys, enables a good integrity to be maintained during the cutting and also a uniform dispersion and highly homogeneous distribution to be achieved, to which the good mechanical performances of the composites obtained testify. The coating comprises, in addition, with advantage chemical compounds such as a bridging agent of the silane type, antistatic agents such as quaternary ammonium salts, and surfactant lubricating mixtures such as an alkyl polyalkoxyether fatty ester.

DETAILED DESCRIPTION OF THE INVENTION

The method according to this invention can be carried out in various ways. The direct roving is previously chopped to varying lengths, notably between 4.5 and 50 mm, and preferably from 10 to 25 mm, and especially 13 mm. Its linear mass or count is from 300 to 4800 tex, preferably from 1000 to 2500 tex, and notably 1200 and/or 2400 tex. Similarly, the mean diameter of the single filaments of which it is composed can vary from 10 to 24 micrometers, and is preferably from 14 to 20 micrometers, notably approximately 17 micrometers. These data can, of course, be adapted according to the fibre making equipment that is industrially available.

The final proportion of coating substance relative to the glass of the reinforcement is from 0.4 to 1.21%, and preferably approximately 0.7% by weight, measured by, loss on ignition.

The proportion by mass in the prepreg of the reinforcement in relation to the impregnation paste is advantageously from 10 to 40%, preferably from 15 to 25% and notably approximately 18%.

Any usual thermosetting resin may be used for forming the impregnation paste, but it is notably based upon unsaturated polyesters.

Other details and advantageous characteristics of the invention will become apparent from the following description of two preferred forms of embodiment thereof, the one using a compression moulding technique and the other using an injection moulding technique.

In both cases, the intended application is the production of moulded components for vehicle bodywork, notably rear door components. This is why for the impregnation paste, a paste is used having virtually zero polymerization shrinkage, usually designated by the term "low profile" containing in known manner various fillers and additives and also a thermosetting resin of the unsaturated polyester type.

Its glass thread reinforcement comes from direct roving threads of 1200 tex, made from filaments of 17 micrometers diameter, then chopped into lengths of about 13 mm. The coating for these threads is used in a proportion by mass relative to the glass threads of approximately 0.7%, measured by loss on ignition. It comprises four constituents, the proportions of which are given in the table below as dry percentage by weight of the coating: the adhesive agent is a polyurethane, sold by the Bayer Company under the trade name FU 401. Also used are an amino-silane sold by the Union Carbide Company under commercial name Silane A 1100, a quaternary ammonium salt sold by the Emery Company under the name EMERSTAT 6660, and an alkylpolyalkoxyether-ester mixture sold by the Diamond Shamrock Company under the commercial name NAPCOSTAT FT 504.

TABLE I

| | |
|---|---|
| PU 401 | 4.70% |
| Silane A 1100 | 0.38% |
| Emerstat 6600 | 0.15% |
| Nopcostat FT 504 | 1.0% |

The impregnation paste and said reinforcement are then introduced into a turbulent mixer having a central shaft in a proportion by weight of 18% reinforcement to 82% resin composition, in order to obtain a highly homogeneous mixture. This step lasts for a period of a few minutes for a total final mass of the premixture of the order of 20 kilograms, and is carried out by wet process.

The premixture A thus produced is allowed to stand for approximately 7 days.

A comparison was made by means of a premixture B, containing an identical impregnation paste but in which the incorporated reinforcing strands constituted, in known manner, of assembled rovings of 2400 tex, containing filaments of 14 micrometers diameter. The coating material contains, as adhesive agent, a resin associating together a polyurethane and an epoxy.

It may be stated that up till now two types of mechanical tests have been performed on the pieces moulded from these prepregs: three-point bending tests according to the standard ISO 178 and the Charpy impact test according to standard ISO 1719.

It should be stated that the bending modulus and the failure stress in bending are expressed in magapascals (MPa), the elongation at rupture in percent (%) and the Charpy impact value in Joules per cubic centimeter (J/cm3).

The first form of embodiment relates to a compression moulding process in a disc mould 180 mm in diameter and 3 mm thick, at a moulding temperature of 165° C. under a pressure of 50 bars, or $5 \times 10^6$ Pa.

In this way components A and B are moulded from the premixtures A and B, from which test pieces are removed in two principle directions. The bending and Charpy impact characteristics indicated in the following table are an average of the characteristics obtained for these two types of longitudinal and transverse specimens:

TABLE II

| | Bending | | | Impact |
|---|---|---|---|---|
| | modulus (bending) | failure stress | elongation at rupture | Charpy impact |
| A | 13773 ± 588 | 134 ± 19 | 1.97 ± 0.26 | 1.35 ± 0.42 |
| B | 13630 ± 520 | 150 ± 31 | 1.94 ± 0.30 | 1.22 ± 0.32 |

It will be seen that this premixture A according to the invention enables moulded components to be obtained, the average mechanical properties of which are very similar to those of the components obtained with the reference prepreg B. These properties are even slightly better if a comparison is made between the values of failure stress and the Charpy impact strength. Also, the direct roving reinforcement of prepreg A was much more easily made than the assembled roving reinforcement used in prepreg B, which represents an important saving in time and expense.

The table also demonstrates that the mechanical properties of the test specimen taken in two principal directions from components A and B not only have similar mean values, but also "ranges" about these mean values of the same order of size. This tends to prove that the two types of reinforcement have an equivalent homogeneous distribution in the impregnation pastes, with very similar orientations, whereas one might have expected the direct rovings reinforcement to behave very differently, to have a more heterogeneous distribution and consequently to affect the mechanical properties of the composite test pieces A.

The second form of embodiment relates to an injection moulding process for the same two prepregs A and B. The injection in carried out by feeding from a heated tube equipped with a short screw. The moulding is carried out at 170° C. in a mould, to produce flat plates having two ribs of 180 by 360 mm and thickness 3 mm. Specimens are taken as before. The mechanical results obtained are summarized in the following table.

TABLE III

| | Bending | | | Impact |
|---|---|---|---|---|
| | modulus (bending) | failure stress | elongation at rupture | Charpy impact |
| A | 12310 ± 966 | 89 ± 93 | 1.05 ± 0.61 | 0.74 ± 0.48 |
| B | 13097 ± 1003 | 99 ± 46 | 1.09 ± 0.57 | 0.64 ± 0.47 |

Here again, the pieces moulded with prepreg A according to this invention have characteristics similar to those obtained with prepreg B, and even a certain improvement may be noted of the Charpy impact strength and bending modulus and of the failure stress in bending, which is entirely advantageous for the production of certain components, such as automobile bodywork components.

Other tests were carried out by injection, but this time with industrial moulds; tailgate moulds for an automobile. These components are in fact today very often made up of two assembled parts of composite products: a first part termed "skin part" which is the visible portion, the external appearance of which is therefore particularly important, and a second part known as a "reinforcing part", which cannot be seen once installed and provides mechanical support for the first part.

The tests were carried out with "skin moulds", that is to say moulds for producing the "skin" parts, in the same conditions of pressure and temperature as before with prepregs A, and B, firstly with a single injection point (1), then with two injection points (2). After test specimens were taken, the mechanical results are as follows:

TABLE IV

| | Bending | | | Impact |
|---|---|---|---|---|
| | modulus (bending) | failure stress | elongation at rupture | Charpy impact |
| A (1) | 10601 ± 1141 | 81 ± 32 | 1.17 ± 0.56 | 0.88 ± 0.56 |
| A (2) | 10502 ± 1159 | 79 ± 33 | 1.10 ± 0.54 | 0.80 ± 0.59 |
| B (1) | 10816 ± 1510 | 80 ± 32 | 1.03 ± 0.51 | 0.68 ± 0.44 |
| B (2) | 10788 ± 1203 | 80 ± 33 | 1.02 ± 0.51 | 0.67 ± 0.45 |

The mechanical properties of the parts produced from the two prepregs are very similar, with a clear improvement, this time, in the Charpy impact strength of the components made with prepreg A according to the invention.

In conclusion, the invention has developed a new type of reinforcement with adapted coating for reinforcing thermosetting materials intended to be injection moulded or compression moulded. This has been achieved by overcoming all the problems of processing which the person skilled in the art might have expected and by proposing an economically and technically very interesting solution.

We claim:

1. In the method of moulding a composite product in a mould from a prepreg comprised of an impregnation paste based upon at least one thermosetting resin and a reinforcement of glass threads incorporated into said paste, wherein the improvement comprises the steps of:
   a) forming a plurality of individual and separate glass filaments, each of which has a diameter of from about 14–20 micrometers;
   b) coating said filaments with an adhesive agent based upon at least one polyurethane, said coating being applied in a proportion to the glass filament of between about 0.4 and 1.21% by weight;
   c) feeding said filaments longitudinally of their length into contact with each other to form a strand of direct roving;
   d) chopping the direct roving transversely of its length to form a plurality of chopped direct rovings having lengths between about 10 and 25 mm;
   e) supplying said mould with a prepreg which is comprised of said impregnation paste and said chopped direct rovings; and
   f) forming said composite product from the prepreg of the previous step.

2. Method according to claim 1, wherein the coating of the chopped direct rovings comprises an adhesive agent associating at least one epoxy with at least one polyurethane.

3. Method according to claim 2 wherein the coating of the chopped direct rovings also comprises an aminosilane, a quaternary ammonium organic salt, and an alkyl polyalkoxyether ester mixture.

4. Method according to claim 1, wherein the direct rovings are chopped to lengths of about 13 mm.

5. Method according to claim 1, wherein the direct rovings have a linear mass of from about 300 to 4800 tex.

6. Method according to claim 5, wherein the direct rovings have a linear mass of from about 1000 to 2500 tex.

7. Method according to claim 6, wherein the direct rovings have a linear mass of about 1200 tex.

8. Method according to claim 6, wherein the direct rovings have a linear mass of about 2400 tex.

9. Method according to claim 1 wherein the direct rovings are constituted of filaments having a mean diameter of about 17 micrometers.

10. Method according to claim 1, wherein the proportion of coating relative to the glass threads of the reinforcement is about 0.7% by weight.

11. Method according to claim 1, wherein the proportion by mass of the reinforcement relative to the impregnation paste is between about 10 and 40%.

12. Method according to claim 11, wherein the proportion of mass of the reinforcement relative to the impregnation paste is between about 15 and 25%.

13. Method according to claim 12, wherein the proportion of mass of the reinforcement relative to the impregnation paste is about 18%.

14. Method according to claim 1, wherein the thermosetting resin of the impregnation paste is based upon at least one unsaturated polyester.

15. Method according to claim 1 or 14, wherein:
   a) said impregnation paste and said chopped direct rovings are mixed together to form a homogenous mixture defining said prepreg; and
   b) said prepreg is allowed to stand for several days before being supplied to said mould.

* * * * *